No. 701,330. Patented June 3, 1902.
G. H. GRAPES.
HOE.
(Application filed May 7, 1901.)
(No Model.)
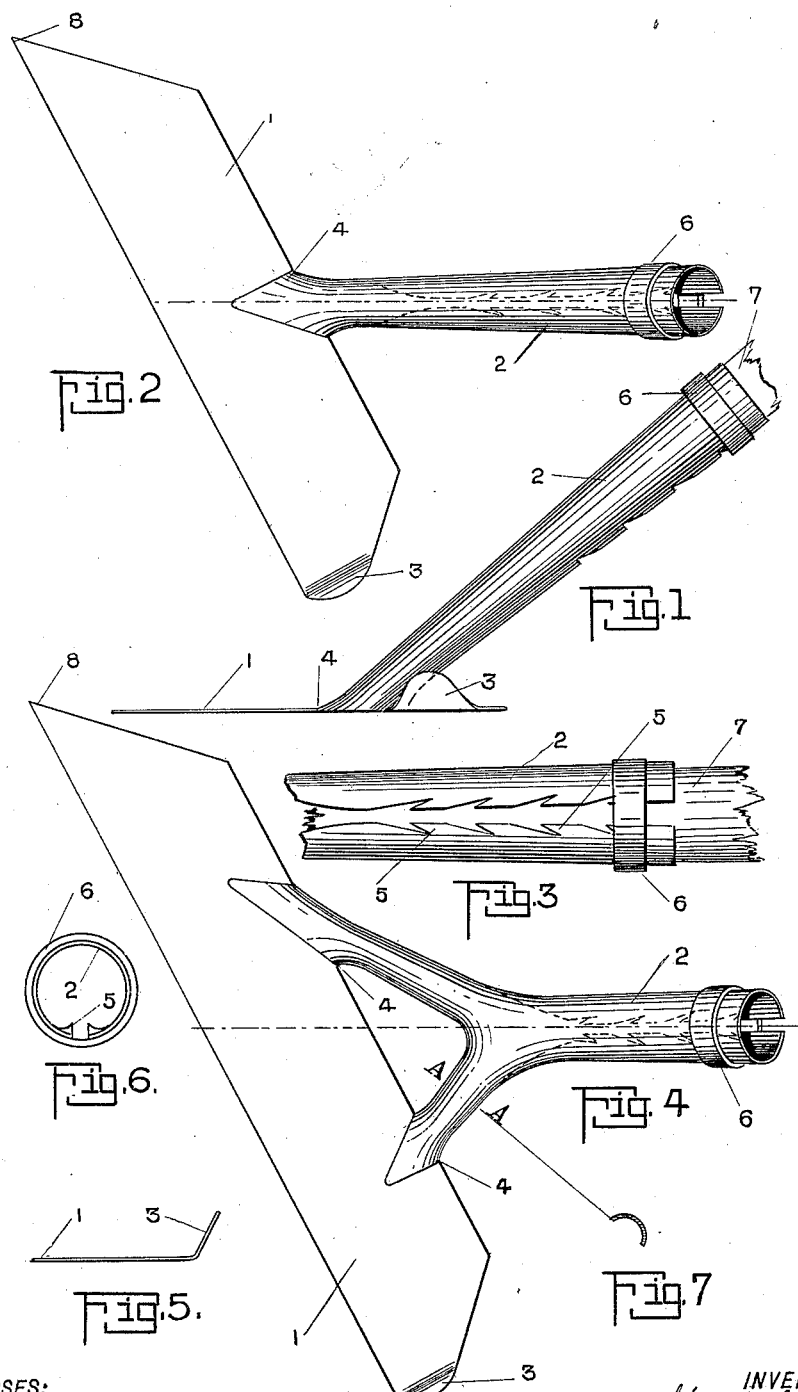
WITNESSES:
INVENTOR
George Hamilton Grapes
BY
Richardson
ATTORNEYS

UNITED STATES PATENT OFFICE.

GEORGE HAMILTON GRAPES, OF WELLINGTON, NEW ZEALAND.

HOE.

SPECIFICATION forming part of Letters Patent No. 701,330, dated June 3, 1902.

Application filed May 7, 1901. Serial No. 59,112. (No model.)

*To all whom it may concern:*

Be it known that I, GEORGE HAMILTON GRAPES, fruit specialist, a subject of the King of Great Britain, residing at Paraparaumu, Wellington, in the Colony of New Zealand, have invented a new or Improved Hoe; and I do hereby declare that the following is a full, clear, and exact description of the invention, which will enable others skilled in the art to which it appertains to make and use the same.

My invention has for its object to provide a hoe cheap to manufacture and having means for preventing the tendency which a hoe has to travel laterally when the blade is set at an angle to the line of thrust and having means for firmly securing the handle in a simple manner and shaping the root of the socket so that it will offer little resistance when moving through soil, will not clog with earth, and will aid in more effectively stirring, disintegrating, and aerating the same.

I stamp my hoe and its socket in one piece out of a sheet of steel and with the blade set at an angle to the socket. The rear point of the blade is raised to prevent the blade traveling sidewise and to throw earth away from plants.

Figure 1 is a side view of the hoe. Fig. 2 is a plan of the same. Fig. 3 is a rear view of the socket and its ring. Fig. 4 is a plan of a hoe with the socket bifurcated. Fig. 5 is a view of the rear end of the blade. Fig. 6 is an end view of the socket and its ring. Fig. 7 is a section on line A A, Fig. 4.

Similar figures of reference indicate similar parts.

On the drawings, 1 is the blade set at an angle to the line of thrust or the socket 2, as shown in plan in Figs. 2 and 4. In elevation, as shown in Fig. 1, the said blade is also at an angle to the socket to throw the handle 7 (partly shown in Figs. 1 and 3) into a convenient position for thrusting the blade through the soil. The angular position of the blade, as shown in Figs. 2 and 4, reduces the force necessary to drive the hoe through the ground and enables the operator to walk along one row of plants while cultivating the next. In this manner weeds which have been uprooted are not trodden upon, and so made to take root again. The operator may keep himself erect, while the blade rests flatly upon the ground, and the whole weight of the hoe is sustained by the ground.

The rear point of the blade is turned up to form an ear 3 to prevent the blade traveling sidewise, and it also throws earth away from the plants, which might otherwise be damaged thereby. This ear is shaped as shown in Fig. 5 to prevent it being choked with earth and to stir up the soil effectively.

The socket 2, which may spring from the blade, as shown, or rise therefrom by an easy curve, is stamped out of the sheet solid with the blade and at its root 4 is formed into an angle, so that it will readily cut through the soil. In the case of the bifurcated socket (shown in Fig. 4) the angular root is developed into a semicircle, as shown in Fig. 7, and then into the circular socket. The edges of the socket are furnished with barbs 5, formed by slitting the edges at an angle and then turning the points inward. A slight taper is given to the socket, and a ring or band 6 fits the socket. It will be seen that a line through the center of the handle in Figs. 2 and 4 will cut the front edge of the blade at a point farther away from the rear point or ear 3 than from the front point 8 for the purpose of overcoming a tendency which the blade has to travel laterally to the right hand.

The handle 7 is fitted to the socket when the ring 6 is at the lower end of the socket, and the said ring is then forced upward to press the barbs into the handle to secure the same.

I designate the point 8 the front end, because this is the point which is in advance when the implement is pushed in a direction axial of the handle. The lug on the end of the blade extends in a plane converging with the axial plane of the handle. By this construction when the hoe is pushed in a line corresponding to the axial line of the handle the lug moves at an angle through the soil, and thus pulverizes it.

What I claim, and desire to secure by Letters Patent, is—

1. A hoe having its blade inclined to the axis of the handle which latter is set so that its axis will cut the cutting edge of the blade nearer to the front end 8 of the blade than to the rear end and an upturned lug 3 at the rear end of the blade extending in a plane converging with the axial plane of the handle, substantially as described.

2. In a hoe, barbs formed on the edges of the socket in combination with a ring for forcing the barbs into the handle, substantially as set forth herein.

3. In a hoe having its blade set at an angle, in combination, a socket placed so that its axis will cut the cutting edge nearer to the front end 8 of the blade than to the rear end, an ear on the rear point of the blade, barbs on the edges of the socket, and a securing-ring for forcing the barbs into the handle, substantially as set forth herein.

In testimony that I claim the foregoing as my invention I have signed my name in presence of two subscribing witnesses.

GEORGE HAMILTON GRAPES.

Witnesses:
E. S. BALDWIN,
STANLEY W. JONES.